July 22, 1958  J. A. O'CONNOR  2,844,235
MECHANICAL THROTTLE SPEED CONTROL DEVICE
Filed Jan. 19, 1955
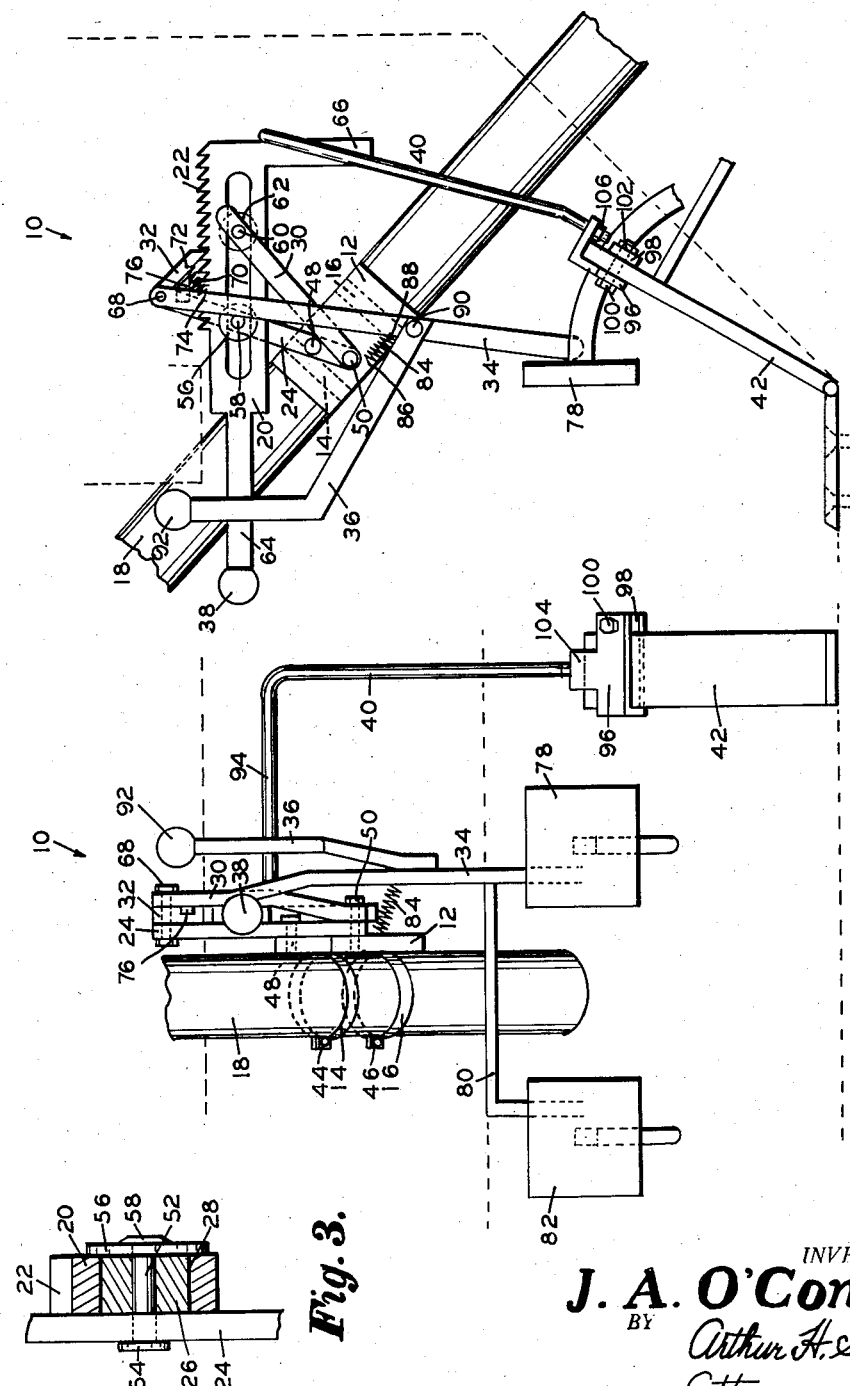
INVENTOR.
J. A. O'Connor
BY Arthur H. Sturges.
Attorney

United States Patent Office

2,844,235
Patented July 22, 1958

2,844,235

MECHANICAL THROTTLE SPEED CONTROL DEVICE

Jerome A. O'Connor, Council Bluffs, Iowa

Application January 19, 1955, Serial No. 482,752

4 Claims. (Cl. 192—3)

This invention relates to speed control devices adapted to be used on motor vehicles for retaining a throttle of a vehicle in such a position that the vehicle travels at constant speed under certain operating conditions, and in particular control instrumentalities whereby after attaining a selected speed by operation of a foot pedal a device is adapted to be set manually to hold the throttle in such a position that upon release of the foot pedal the vehicle will continue to travel at the selected speed, and wherein upon depressing the foot pedal further to temporarily increase the speed for passing, climbing a hill, or the like, the vehicle returns to the selected speed upon release of the foot pedal.

The purpose of this invention is to provide a speed control device for motor vehicles whereby a vehicle may travel at a constant speed over long distances and through long periods of time without the attention of the operator.

Various types of devices have been provided for limiting the speed of motor vehicles, however, such devices, such as the speed regulating mechanism of my prior U. S. Patent No. 2,364,092, have been designed to be mounted under the hood of the vehicle, and with the modern types of motor vehicles the area under the hood is substantially filled with automatic devices for operating the vehicle and it is substantially impossible to install devices such as the device of the patent, which issued in December 5, 1944, under the hood.

With this thought in mind this invention contemplates a speed control device that is adapted to be installed on the post of the steering wheel of the vehicle and wherein it is within easy reach of the operator thereof.

The object of this invention is, therefore, to provide a speed control device for motor vehicles that is adapted to be mounted on the steering wheel post of the vehicle and that is within reach of the operator of the vehicle.

Another object of the invention is to provide a mechanical speed control device for motor vehicles that is adapted to be mounted on the post of the steering wheel of the vehicle and that is adapted to coact with the accelerator and brake or clutch pedals of the vehicle.

Another important object of the invention is to provide a mechanical speed control device for motor vehicles which permits the vehicle to be operated at a higher speed temporarily without changing the position to which the control device is set.

A further object of the invention is to provide mechanism for retaining the accelerator pedal of a motor vehicle whereby the vehicle travels at a constant speed in which the device returns to normal operating condition upon the application of a foot brake or clutch pedal.

A still further object of the invention is to provide a mechanical speed control device for use on motor vehicles in which the device is adapted to be disconnected by the application of a hand lever at the will of the operator of the vehicle.

And a still further object is to provide a mechanical speed control device for motor vehicles that is adapted to be installed on the steering wheel post of the vehicle and set or disconnected by the operator of the vehicle and while the vehicle is in operation, in which the device is of a simple and economical construction.

With these and other objects and advantages in view the invention embodies a base plate mounted by clamps on the steering wheel post of a vehicle, a toothed bar slidably mounted by levers on the base plate, an arm having a pawl pivotally mounted on the upper end positioned to be engaged by a foot or clutch pedal with the pawl adapted to coact with the teeth of the bar, a rod adapted to be mounted on the accelerator pedal and positioned to be actuated by the toothed bar, and suitable hand levers and springs for actuating the parts.

Other features and advantages of the invention will appear from the following description taken in connection with the accompanying drawings, wherein:

Figure 1 is a side elevational view showing the improved speed control apparatus mounted on a post of a steering wheel of a motor vehicle with a part attached to the accelerator pedal, with parts of the post broken away, and with parts of the vehicle shown in dotted lines.

Figure 2 is a front elevational view of the device also showing the device on a post of a steering wheel, with parts of the post broken away, and with parts of the vehicle shown in dotted lines.

Figure 3 is a cross section through a toothed bar of the device showing the slidable mounting of the bar.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a base plate adapted to be secured by clamps 14 and 16 to a post 18 of a steering wheel of a motor vehicle, numeral 20 a control bar having teeth 22 in the upper edge, numeral 24 a support bar mounted on the base plate and having a roller 26 positioned in a slot 28 of the control bar, numeral 30 a lever also mounted on the base plate and having a roller positioned in the slot 28 of the control bar, numeral 32 a pawl carried by the upper end of the support bar 24, numeral 34 an arm also connected to the upper end of the support bar and positioned to be engaged by a brake or clutch pedal, numeral 36 a hand lever extended from the arm 34 for manually releasing the control device, numeral 38 a knob for setting the control bar, and numeral 40 a rod adapted to be attached to an accelerator pedal 42 of a vehicle in which the device is installed.

The clamps 14 and 16 of the base plate 12 extend around the steering wheel post 18 and the extended ends thereof are retained in gripping relation with the post with bolts 44 and 46. The support bar 24 is secured to the base plate 12 with bolts 48 and 50, the bolt 50 also extending through the lower end of the lever 30 which extends outwardly to correspond with the outer surface of the control bar 20, as shown in Figure 2.

The roller 26 on the support bar 24 is mounted on a stud 52 having a head 54 which is positioned against one side of the bar 24, and the opposite end of the stud is peened over a washer 56, as shown at the point 58.

A roller on the extended end of the lever 30 is mounted on a similar stud 60, one end of which is peened over a washer 62. By this means the control bar 20 is adapted to be moved by the knob 38 on the end of a rod 64 extended from the control bar so that with the accelerator pedal 42 held whereby the vehicle travels at a desired speed the control bar may be moved until a depending section 66 thereof is in engagement with an extended end of of the rod 40. Upon release of the accelerator pedal the control bar 20 is retained in position by the pawl 32 which is pivotally mounted in the upper ends of the support bar 24 and arm 34 by a bolt 68. The pawl is urged into holding relation with the teeth 22 of the control bar by a spring 70, one end 72 of which is connected to the pawl and the other end 74 to the arm 34.

The arm 34 is also provided with a projection or lug 76 that is positioned to engage the pawl to elevate the pawl above the teeth 22 as the brake pedal 78 is actuated, whereby pressing upon the brake pedal releases the speed control device, making the device inoperative, and returning the operating elements to conventional operating positions. The arm 34 is also provided with a side bar 80 that is adapted to extend to be engaged by a clutch pedal 82, when the control device is used in vehicles having clutch pedals. The lower end of the arm 34, and also the end of the side bar 80 are urged against the pedals 78 and 82, when the clutch pedal is used, by a spring 84, one end 86 of which is connected to the base plate 12, and the other end 88 to the arm.

The hand lever 36 is secured to the arm 24 with a bolt or other fastener, as indicated by the numeral 90, and the extended end of the lever is provided with a knob 92.

The rod 40, which is provided with an extended end 94, is secured to the accelerator pedal 42 with a clamp having an upper bar 96 and a lower bar 98, and the bars, which are integral at one side of the clamp, are secured over the pedal with a bolt 100, on the threaded end of which is a nut 102. The upper bar 96 is provided with an L-shaped extension 104 in which a threaded lower end of the rod 40 is secured by a nut 106.

With the parts designed and assembled in this manner the base plate 12 is mounted on the post of the steering wheel of a vehicle and the rod 40 secured to the accelerator pedal, as shown in Figure 1. The vehicle is then operated in the usual manner and with the vehicle traveling at a desired speed the control bar 20 is set by the knob 38 until the depending section 66 engages the extended end 94 of the rod 40. In this movement the pawl 32 snaps over the teeth 22 and the control bar is retained in the desired position by the pawl, thereby holding the accelerator pedal in such a position that the vehicle will continue to travel at a constant speed even though the foot of the operator is removed from the accelerator pedal. With the control bar retained by the pawl the accelerator pedal may be depressed to provide additional speed for passing, hill climbing, and the like, and as soon as the accelerator pedal is released it will return until the extended end 94 of the rod 40 engages the section 66 of the control bar 20.

Upon depressing a brake or clutch pedal the arm 34 is moved forwardly whereby the lug 76 raises the pawl 32 which releases the control bar permitting the bar to slide to its original or inoperative position. The arm 34 is also adapted to be manually actuated by the hand lever 36 to release the control bar so that the device may be disconnected or made inoperative at any time.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to in actual practice, if desired.

Having now described the invention, that which is claimed to be new and desired to be procured by Letters Patent is:

1. A speed control device for a motor vehicle having an accelerator pedal comprising a horizontally disposed control bar, said control bar having a slot therein, teeth in the upper surface, and a depending section on one end, means including a roller positioned in said slot for slidably mounting the control bar on a post of a steering wheel of a motor vehicle, a pawl positioned to engage the teeth of the control bar for retaining the control bar in adjusted positions, means for mounting the pawl on the post of the steering wheel, a rod mounted on the accelerator pedal and positioned to engage the depending section of the control bar for retaining the accelerator pedal in adjusted positions, and an arm pivotally mounted on the control bar mounting means, adapted to be engaged by foot brake and clutch pedals of the vehicle, and having means thereon for engaging the pawl to release the control bar.

2. In a motor vehicle speed control, the combination which comprises a base plate, clamps for mounting the base plate on a steering wheel post of a motor vehicle, a control bar having teeth in the upper surface, a support bar mounted on the base plate and slidably connected to the control bar for supporting the control bar in operative position above the base plate, a lever also mounted on the base plate and slidably connected to the control bar, a rod adapted to be mounted on an accelerator pedal of a vehicle and positioned to be engaged by the control bar, a pawl carried by the support bar and adapted to coact with the teeth of the control bar for retaining the control bar in adjusted positions, and means for actuating the pawl by the foot brake and clutch pedals of the vehicle to release the control bar.

3. In a motor vehicle speed control, the combination which comprises a base plate, clamps for mounting the base plate on a steering wheel post of a vehicle, a control bar having an elongated slot therein, a depending section on one end and teeth on the upper edge, a support bar mounted on the base plate and having a roller extended into the slot of the control bar for supporting the control bar in operative position, a lever also mounted on the base plate and also having a roller extended into the slot of the control bar, a pawl carried by the support bar and positioned to coact with the teeth of the control bar for retaining the control bar in adjusted positions, resilient means for urging the pawl into engagement with the teeth, a rod adapted to be attached to an accelerator pedal of a vehicle with the extended end of the rod positioned to engage the depending section of the control bar, an arm pivotally mounted on the support bar and positioned to be engaged by another foot pedal of the vehicle, said arm having a lug thereon and said lug being positioned to engage the pawl to elevate the pawl from the teeth of the control bar upon operation of the foot pedal positioned to engage the arm pivotally mounted on the support bar, and a hand lever for actuating said arm, the free connection to the control bar of the rod permitting the accelerator pedal to be advanced for temporarily increasing the speed of the vehicle.

4. In a speed control for a motor vehicle having an accelerator pedal and a brake pedal, the combination which comprises a horizontally disposed control bar having teeth in the upper surface, an elongated longitudinally disposed slot in the intermediate part, and a knob extended from one end, a support bar mounted in the vehicle and having a roller extended into the elongated slot of the control bar, a lever also mounted in the vehicle and also having a roller extended into the elongated slot of the control bar, the roller of the support bar being spaced from the roller of the lever and said rollers being positioned whereby the control bar is supported in a horizontal position, a pawl carried by the upper end of the support bar and positioned to coact with the teeth in the upper surface of the control bar for retaining the control bar in adjusted positions, means for manually actuating the pawl to release the control bar, means designed to be attached to the accelerator pedal of the vehicle for engaging the control bar to limit return movement of the accelerator pedal, and means for actuating the pawl to release the control bar upon application of the brake pedal of the vehicle.

References Cited in the file of this patent

UNITED STATES PATENTS

| | | |
|---|---|---|
| 1,226,118 | Salt | May 15, 1917 |
| 1,572,774 | Croxford | Feb. 9, 1926 |
| 2,145,665 | Rodgers | Jan. 31, 1939 |
| 2,364,092 | O'Connor | Dec. 5, 1944 |
| 2,490,473 | Rodkey | Dec. 6, 1949 |
| 2,568,481 | Bianca | Sept. 18, 1951 |
| 2,712,762 | Pavlik et al. | July 12, 1955 |

FOREIGN PATENTS

| | | |
|---|---|---|
| 798,946 | France | Mar. 14, 1936 |